United States Patent
Howell et al.

(10) Patent No.: US 11,331,582 B2
(45) Date of Patent: *May 17, 2022

(54) FACILITATING EVENT IMPLEMENTATION IN AN ONLINE GAME

(71) Applicant: Kabam, Inc., San Francisco, CA (US)

(72) Inventors: Jeff Howell, Vancouver (CA);
Benjamin Talbot, Vancouver (CA);
Thierry Tremblay, Vancouver (CA);
Dan Stovell, Vancouver (CA)

(73) Assignee: Kabam, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/920,567

(22) Filed: Jul. 3, 2020

(65) Prior Publication Data
US 2020/0330879 A1 Oct. 22, 2020

Related U.S. Application Data

(63) Continuation of application No. 16/115,305, filed on Aug. 28, 2018, now Pat. No. 10,702,780, which is a (Continued)

(51) Int. Cl.
*A63F 13/79* (2014.01)
*G07F 17/32* (2006.01)
*A63F 13/69* (2014.01)

(52) U.S. Cl.
CPC ............ *A63F 13/79* (2014.09); *A63F 13/69* (2014.09); *G07F 17/3244* (2013.01); *G07F 17/3255* (2013.01); *G07F 17/3262* (2013.01); *G07F 17/3269* (2013.01); *A63F 2300/204* (2013.01); *A63F 2300/535* (2013.01);
(Continued)

(58) Field of Classification Search
None
See application file for complete search history.

(56) References Cited

U.S. PATENT DOCUMENTS

| 8,257,177 B1 | 9/2012 | Saund |
| 8,267,792 B2 | 9/2012 | Buchholz |
| (Continued) | | |

FOREIGN PATENT DOCUMENTS

CA 2498789 3/2004

*Primary Examiner* — Jason T Yen
(74) *Attorney, Agent, or Firm* — Esplin & Associates, PC

(57) ABSTRACT

A system and method for facilitating implementation of events in an online game are disclosed. Award information may be received from user. The received award information may define a type of in-game award to be distributed to players of the online game. The award information may include information indicate a corresponding award handler for determine and/or distributing the instances of the award to the players. Event information may be received from user. The received event information may specify details for implementing an event in the online game. The received event information may include event award information indicating one or more instances of an award of an award type defined by the received award information. The event information may be used to automatically implement the event in the online game, and the instances of the award may be distributed to the participating players in accordance with the event award information.

18 Claims, 7 Drawing Sheets

Related U.S. Application Data continuation of application No. 14/965,742, filed on Dec. 10, 2015, now Pat. No. 10,068,431.

(52) U.S. Cl.
CPC ............ *A63F 2300/5526* (2013.01); *A63F 2300/5533* (2013.01); *A63F 2300/57* (2013.01); *A63F 2300/609* (2013.01); *A63F 2300/6036* (2013.01); *A63F 2300/65* (2013.01); *A63F 2300/807* (2013.01)

(56) References Cited

U.S. PATENT DOCUMENTS

| | | |
|---|---|---|
| 8,366,554 B1 | 2/2013 | Yuan |
| 9,168,459 B1 | 10/2015 | DeLaet |
| 9,440,143 B2 | 9/2016 | Wakeford |
| 9,539,509 B2 | 1/2017 | Delaet |
| 9,623,322 B1 | 4/2017 | Wakeford |
| 9,744,454 B1 | 8/2017 | Delaet |
| 10,193,999 B1 | 1/2019 | Howell |
| 10,498,860 B2 | 12/2019 | Howell |
| 10,702,780 B2 | 7/2020 | Howell |
| 10,709,977 B2 | 7/2020 | Delaet |
| 2003/0031062 A1 | 2/2003 | Tsurugai |
| 2006/0079329 A1 | 4/2006 | Yamada |
| 2007/0294387 A1 | 12/2007 | Martin |
| 2008/0057894 A1 | 3/2008 | Aleksic |
| 2008/0146338 A1 | 6/2008 | Bernard |
| 2010/0004045 A1* | 1/2010 | Roemer ............ G07F 17/3244 463/16 |
| 2010/0135544 A1 | 6/2010 | Mattiuzzi |
| 2010/0162207 A1* | 6/2010 | Nathan ............ G06F 8/20 717/107 |
| 2011/0086701 A1* | 4/2011 | D'Amico ............ G07F 17/3239 463/29 |
| 2011/0263332 A1 | 10/2011 | Mizrachi |
| 2012/0015740 A1* | 1/2012 | Vanbragt ............ A63F 13/795 463/42 |
| 2012/0036003 A1* | 2/2012 | Tong ............ G06Q 30/0207 705/14.39 |
| 2012/0123570 A1* | 5/2012 | Guinn ............ G07F 17/32 700/91 |
| 2012/0283008 A1* | 11/2012 | Martone ............ A63F 13/355 463/29 |
| 2013/0032637 A1 | 2/2013 | Yang |
| 2013/0225282 A1 | 8/2013 | Williams |
| 2013/0273996 A1 | 10/2013 | Froy |
| 2013/0303288 A1 | 11/2013 | McCoy |
| 2013/0304584 A1 | 11/2013 | McCoy |
| 2013/0310084 A1 | 11/2013 | Irish |
| 2013/0316811 A1 | 11/2013 | Azuma |
| 2013/0326374 A1 | 12/2013 | Harvey |
| 2014/0039990 A1* | 2/2014 | Georgi ............ G06Q 30/0229 705/14.3 |
| 2014/0258474 A1 | 9/2014 | Kim |
| 2014/0370969 A1 | 12/2014 | LeMay |
| 2015/0005055 A1* | 1/2015 | Alderucci ............ G07F 17/3227 463/25 |
| 2015/0011277 A1 | 1/2015 | Wakeford |
| 2015/0045105 A1* | 2/2015 | Leslie ............ G07F 17/3244 463/20 |
| 2015/0194013 A1 | 7/2015 | Herold |
| 2016/0038835 A1 | 2/2016 | DeLaet |
| 2016/0292810 A1 | 10/2016 | Fine |
| 2016/0309292 A1 | 10/2016 | Kerr |
| 2017/0103410 A1 | 4/2017 | Kerr |
| 2018/0365935 A1 | 12/2018 | Howell |
| 2019/0143210 A1 | 5/2019 | Delaet |
| 2019/0149637 A1 | 5/2019 | Howell |
| 2020/0084298 A1 | 3/2020 | Howell |
| 2020/0330865 A1 | 10/2020 | Delaet |

* cited by examiner

FACILITATING EVENT IMPLEMENTATION IN AN ONLINE GAME

FIELD OF THE DISCLOSURE

This disclosure relates to providing and implementing an online game on individual client devices, in particular facilitating event implementation in the online game.

BACKGROUND

Game scripting languages that enable programmers and/or non-programmers alike to develop a new game for to customize an existing game is generally known in the art. Some game scripting languages allow users to create and populate data structures that are later consumed by the game engine. Such game scripting languages are often declarative and are either executed or parsed offline or at runtime when the data is loaded into memory. Some game scripting languages are intended to be executed within the context of the game engine at runtime. These languages are usually used to extend or customize the hard-coded functionality of the game engine's game object model and/or other game engine systems. Some examples of game scripting languages are QuakeC, unrealScript, Lua, and Python.

Some scripting languages allow game object types that have been implemented in the native language to be extended via script. Callbacks and event handlers are examples of this. An event handler is typically a special type of hook function whose purpose is to allow a game object to respond to some relevant occurrence within the game world (e.g., responding to an explosion going off) or within the engine itself (e.g., responding to an out-of-memory condition). Many game engines allow users to write event handler hooks in script as well as in the native language.

SUMMARY

One aspect of the disclosure relates to facilitating implementation of events within an online game. Interfaces may be provided on client devices to enable users to provide award types such that instances of awards of user provided award types may be distributed to players within the online game. An award handler corresponding to a given award type provided by the user(s) may be stored and invoked by a game engine, and/or other components that execute scripts or functions of the online game to distribute instances of the awards of the award type to players within the online game. Similarly, intuitive interfaces may be provided on client devices to enable the users to create or modify events for implementation in the online game. Such interfaces may enable the users to provide event information such that the game engine, and/or components that execute scripts or functions of the online game s may automatically implement the events in accordance with the event information provided by the users. When providing event information for a given event, the users may be enabled by the interfaces to specify one or more instances of awards of the award types provided by the users as event awards to be distributed to the players participating in the given event, to specify award requirements for distributing the instances of the awards, and/or any other operations. In some examples, an event handler corresponding to a given event provided by the user(s) may be stored, and may include scripts or functions for implementing the given event. Such scripts or functions may be executed by the game engine for implementing the event within the online game automatically. This may facilitate developing and/or implementing the online game by users without requiring the users to recompile or redeploy the online game.

In some implementations, a system configured to facilitate implementation of events within an online game may include one or more servers, which may comprise one or more processors configured to execute machine-readable instructions. The one or more processors may comprise a game engine, an event controller, a messenger daemon, a delivery daemon, an event interface component, an event information component, an award interface component, an award information component, and/or any other components.

The game engine may be configured to execute user actions to facilitate interaction of the users with the online game and/or each other in response to receiving online game commands input by the users. Within the instance of the online game executed by the game engine, awards may be distributed to players. The distributed awards may induce changes to the online game state or other game related effects that make other goals easier to complete. Within the instance of the online game executed by game engine, events may be implemented for participation by the players. Typically, an event implemented in the online game may include one or more goals, objectives, targets, preset achievements (e.g., player levels), and/or other types of agenda for the players to achieve. Awards may be distributed to players at the end of a given event in the online game.

The event controller may be configured to control implementation of events in the online game based on event information provided by users. This may involve obtaining the event information from an event information database, determining one or more events are to be started in the online game, implementing the one or more events in the online game in accordance with the event information by updating the game interfaces on the client devices and/or updating one or more online game databases, updating results of event(s) that is currently is in session in the online game, ending event(s) that has finished as indicated by the event information, and/or any other operations. The event information based on which the events may be implemented by event controller may contain various details regarding the individual events to be implemented in the online game. In some implementations, the event information regarding a given event may include information indicating a corresponding event handler for implement the given event in the online game. Such an event handler may include a block or blocks of script code. The event controller may be configured to execute scripts, routines, programs, and/or any other type of directives or executables provided by provider, administrator, moderator, users, and/or any other entities related to the online game. The scripts, routines, programs and/or any other type of directives or executables that may be executed by the event controller may be for automatically implementing events in the online game, distributing and/or determining event awards to players within the online game, and/or for causing the event controller to perform any other operations.

The messenger daemon may be configured to transmit to client devices messages regarding the events implemented by the event controller. In some implementations, the messenger daemon may receive instructions from the event controller to transmit messages regarding a specific event implemented by the event controller. For example, the messenger daemon may receive a specific event announcement request from the event controller, and the received request may include the announcement message the event controller requests the messenger daemon to transmit to the client devices.

The delivery daemon may be configured to determine and/or distribute awards for the players participating in the events implemented by the event controller. This may involve instantiating Awards of corresponding award types, distributing the instances of the awards to the inventory of players, recording the awards that have been distributed to the players, and/or any other operations. In some implementations, the delivery daemon may determine and/or distribute awards to individual players based on award information regarding individual types of awards, which may be obtained from an event information database, a game database, and/or any kind of electronic storage related to the online game. In some implementations, the award information regarding a given type of award may include information indicating a corresponding award handler. Such an award handler may include a block or blocks of script code. For example, the award handler may be used by the delivery daemon to control award determination and/or distribution of instances of the award of the given type. The delivery daemon may be invoked by the event controller when implementing a given event to distribute one or more event awards to inventories of the players based on their rankings at the end of the event.

The event interface component may be configured to provide an interface on a client device enabling a player associated with the client device to provide event information, which may be used by the event controller to implement events in the online game.

The event information management component may be configured to manage event information provided by the users of the online game. Managing event information by the event information management component may include storing, retrieving, updating, deleting, backing up the event information provided by the users, and/or any other operations.

The award interface component may be configured to provide award interfaces on client devices to enable users to provide information regarding awards to be distributed within the online game.

The award information management component may be configured to manage award information provided by the users of the online game. Managing award information by the award information management component may include storing, retrieving, updating, deleting, backing up the award information provided by the users, and/or any other operations. For example, the award information management component may be configured to retrieve award information in response to a request from the even controller and/or the delivery daemon as described above.

These and other features and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
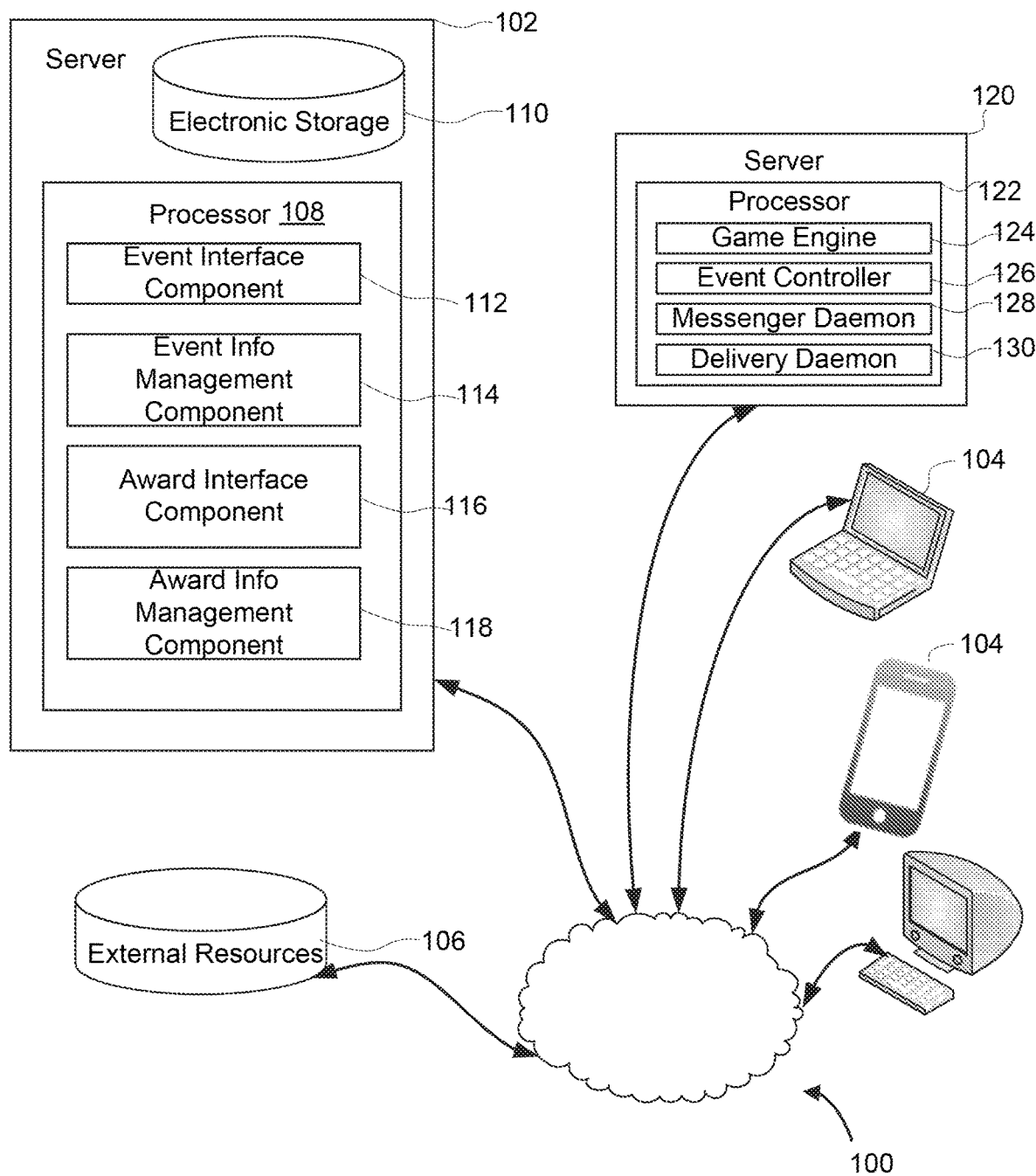
FIG. 1 illustrates one example of a system configured to facilitate implementation of events within an online game in accordance with the disclosure in accordance with the disclosure.

FIG. 1 illustrates one example of a system 100 configured to facilitate implementation of events within an online game in accordance with the disclosure. In some implementations, as shown in this example, system 100 may include a server 120 configured to host the online game, a server 102 configured to manage and/or provide information for implementing events in the online game, and/or any other servers. As shown, the server 102 may communicate with one or more client computing platforms 104 according to a client/server architecture. The users may access system 100 via client computing platforms 104. As shown, server 102 may comprise processors 122 configured to execute computer-readable instructions to implement system components. The computer program components may include one or more of a game engine 124, an event controller 126, a messenger daemon 128, a delivery daemon 130, and/or other components.

The game engine 124 may be configured to execute an instance of the online game. The instance of the online game executed by the game engine 124 may be implemented by client computing platforms 104 for presentation to and interaction by the users of the online game. Within the instance of the online game executed by the game engine 124, users may interact with elements in the online game and/or with each other through gameplays provided by the online game. The gameplays may include role-playing, first-person shooter, real-time strategy, turn-based strategy, simulation, music or rhythm playing, card playing, board game, social interaction, twitching, and/or any other gameplays. The execution of the instance of the online game by game engine 124 may include determining a state associated with the online game. The state may be communicated (e.g., via streaming visual data, object/position data, and/or other state information) from server 102 to client computing platforms 104 for presentation to users. The state determined and transmitted to a given client computing platform 104 may correspond to a view for a user character being controlled by a user via the given client computing platform 104. The state determined and transmitted to a given client computing platform 104 may correspond to a location in a online game associated with the online game. The view described by the state for the given client computing platform may correspond, for example, to the location from which the view is taken, the location the view depicts and/or other locations, a zoom ratio, a dimensionality of objects, a point-of-view, and/or view parameters of the view. One or more of the view parameters may be selectable by the user.

The instance of the online game may be persistent. That is, the online game may continue on whether or not individual users are currently logged in and/or participating in the online game. A user that logs out of the online game and then logs back in some time later may find the online game associated with the online game has been changed through the interactions of other users with the online game during the time the user was logged out. These changes may include changes to the simulated physical space, changes in the user's inventory, changes in other users' inventories, changes experienced by non-user characters, and/or other changes.

The instance of the online game may comprise a simulated online game, e.g., a online game that is accessible by users via clients (e.g., client computing platforms 104) that present the views of the online game to a user. The online game may have a topography, express ongoing real-time interaction by one or more users, and/or include one or more objects positioned within the topography that are capable of locomotion within the topography. In some instances, the topography may be a two-dimensional topography. In other instances, the topography may be a three-dimensional topography. The topography may include dimensions of the space and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer components may be synchronous, asynchronous, and/or semi-synchronous.

The instance of the online game may comprise online game entities automatically controlled in the instance of the online game. Such online game entities may not be associated with any user. As such, the automatically controlled online game entities may be generated and/or developed by artificial intelligence configured with the server 102 by provider(s), administrator(s), moderator(s), and/or any other entities related to the online game. These automatically controlled entities may evolve within the online game associated with the online game free from user controls and may interact with the entities controlled by or associated with the users, other automatically controlled online game entities, as well as the topography of the online game. Certain manifested traits may be associated with the automatically controlled entities in accordance with the artificial intelligence configured with the server 102.

The above description of the manner in which the state of the online game associated with the online game as determined by game engine 124 is not intended to be limiting. The game engine 124 may be configured to express the online game in a more limited, or richer, manner. For example, views determined for the online game representing the state of the instance of the online game may be selected from a limited set of graphics depicting an event in a given place within the online game. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the online game are contemplated. As another example, the online game may be simply expressed as a background for card playing actions, e.g., simple art depicting a table top. As yet another example, the online game may be expressed as a game board on which game pieces associated with the users may be moved.

Within the instance of the online game executed by game engine 124, the users may participate in the instance of the online game by controlling one or more of an element in the online game associated with the online game. The user-controlled elements may include avatars, online game characters, online game units (e.g., troops), objects (e.g., weapons, horses, vehicle and so on), simulated physical phenomena (e.g., wind, rain, earthquakes, and/or other phenomena), and/or other user-controlled elements. The user-controlled avatars may represent the users in the online game. The user characters may include heroes, knights, commanders, leaders, generals, and/or any other online game entities that may possess strength, skills, abilities, magic powers, knowledge, and/or any other individualized attributes. The online game units controlled by the user may include troops and/or any other online game entities that may be trained, recruited, captured, and/or otherwise acquired by the users in groups or en-mass. The objects controlled by the users may include weapons, vehicles, projectiles, magic items, wardrobes, boots, armor, knapsacks, medicine, healing potions, and/or any other virtual items that may be employed by the users for interaction within the online game.

In any case, the user-controlled elements may move through and interact with the online game (e.g., the automatically controlled entities, elements controlled by other users, and/or topography in the online game) associated with the online game. The elements controlled by a given user may be created and/or customized by the given user. The given user may have an "inventory" of virtual goods and/or currency usable within the online game.

Controls of virtual elements in the online game may be exercised through commands inputted by a given user through client computing platforms 104. The given user may interact with other users through communications exchanged within the online game. Such communications may include one or more of textual chat, instant messages, private messages, voice communications, and other communications (if any). Communications may be received and entered by the users via their respective client computing platforms 104. Communications may be routed to and from the appropriate users through server 102 (e.g., through game engine 124).

A given user may input commands with specific parameters to undertake specific deeds, actions, functions, spheres of actions, and/or any other types of interactions within the online game. For example, the given user may input commands to construct, upgrade, and/or demolish virtual buildings; harvest and/or gather virtual resources; heal virtual user-controlled elements, automatically controlled entities, and/or elements controlled by other users; train, march, transport, reinforce, reassign, recruit, and/or arrange troops; attack, manage, create, demolish, and/or defend cities, realms, kingdoms, and/or any other online game locations controlled by or associated with the users; craft or transport virtual items; interact with and/or compete against or along with non-user entities and/or online game elements controlled by other users in combats; research technologies and/or skills; mine and/or prospect for virtual resources; complete missions, quests, and/or campaigns; exercise magic power and/or cast spells; draw and/or deal cards; move pieces on a game board; and/or perform any other specific deeds, actions, functions, or sphere of actions within the online game. In some examples, the given user may input commands to compete against elements in an environment within the online game—i.e., User vs. Environment (PvE) activities. In some examples, the given user may input commands to compete against each other within the online game—i.e., User vs. User (PvP) activities.

The game engine 124 may be configured to execute user actions to facilitate interaction of the users with the online game and/or each other in response to receiving online game commands input by the users. Execution of the user action by the game engine 124 may produce changes to the game state, which may reflect progression and/or results of the user actions. In some examples, state changes caused by the execution of the user actions may be recorded in the electronic storage 110 to facilitate persistency throughout the instance of the online game. In some examples, execution of the user actions may not produce persistent changes to the game state (e.g., a user character jumping forward and backward successively may not produce any perceivable game state changes to other users).

Within the instance of the online game, virtual currencies may be provided to store and/or exchange of online game values. Units of the virtual currencies (for example, gold, gem, silver, coin, token, and/or any other types of virtual currencies) may reflect online game values as determined by a provider, administrator, moderator, user, and/or any other entities related to the online game. Through one or more units of virtual currencies, online game values may be captured, stored, and circulated in the online game. As one non-limiting example, combinations of user actions, skills, virtual items, time, and/or any other online game elements may be captured, stored, and circulated through virtual currencies to reflect online game values created by user labor in interacting with the online game. For instance, a user may be provided 1,000 gems after prospecting and mining for the gems in the online game for a period of time with certain required mining equipment operable only by a skilled online game miner, which the user has expanded labor to become.

Within the instance of the online game executed by the game engine 124, virtual currencies may be collected, earned, purchased, gifted, or otherwise acquired by the users. For example, the users may purchase the virtual currencies with real-world money consideration (e.g., credit payment through credit card, electronic vouchers provided by the provider of the online game, physical tokens, and/or any other types of real-world currencies) through a virtual store. The users may earn the virtual currencies, for example through gameplays provided in the online game (e.g., PvP activities, PvE activities, in-game tournaments, tasks, quests, missions, and/or any other gameplays in the online game). By way of non-limiting example, a given user may earn a predetermined amount of virtual currencies after completing an in-game task in the online game. In some examples, the provider of the online game may simply make a certain amount of virtual currencies available to the users, for instance through treasure troves in the online game such that the users may gratuitously collect the virtual currencies by exploring for the treasure troves. In some other examples, the users may acquire virtual currencies by receiving gifts that comprise virtual currencies from other users. One of ordinary skills in the art will appreciate that there are other ways for the users to acquire virtual currencies in the online game.

Within the instance of the online game executed by the game engine 124, resources may be, for example, generated, cultivated, mined, harvested, purchased, earned, consumed, traded, and/or gifted over time by units, characters, pets, buildings, facilities, and/or any other infrastructure or entity in the online game for the user. Resources may be prospected. Resources may be virtual items of value that can be accumulated through participation in the online game, rather than virtual currencies that store values in the online game as described above. As such, resources may be used to satisfy resource requirements in the online game. By way of non-limiting examples, online game resources may include food (e.g., rice, fish, wheat, etc.), minerals (e.g., wood, iron, ore, coal, oil, stone, crystal, etc.), plants, animals, and/or any other resources appropriate for the online game. Transfer of resources between users may be reflected through user inventories such that the transferor user's inventory reduces an amount of the transferred resources that are added to the transferee user.

Within the instance of the online game executed by the game engine 124, awards may be distributed to players. The distributed awards may induce changes to the online game state or other game related effects that make other goals easier to complete. Awards may be divided into awards that affect gameplay and those that are extra-game consequences, typically winning the game or winning a bet based on the game. The distributed awards may be redeemed and/or accessed within online game. Awards that can be redeemed and/or accessed within the online game, or in-game awards, may include, for example, improved or new abilities, improved rankings or levels, virtual items, new player characters, virtual currency, redeemable services within the game space, and/or other type of Awards.

Within the instance of the online game executed by game engine 124, events may be implemented for participation by the players. Typically, an event implemented in the online game may include one or more goals, objectives, targets, preset achievements (e.g., player levels), and/or other types of agenda for the players to achieve. The event may specify one or more locations within the online game the event is to take place; an event period; one or more player criteria the event requires participating players to have; one or more in-game actions involved in the event; one or more resources required for participation in the event; and/or any other event specifics. For example, by way of illustration, an event may be implemented in the online game for players to reach a production goal, e.g., to produce 1000 pieces lumber within the next hour. As another example, a racing event may be implemented in the online game such that top 12 ranked players are invited to the event to compete in a virtual car race at a selected race track in the online game. Still as another example, a tournament event may be implemented in the online game such that teams of players may compete against each other in the tournament until a winner is determined. Other examples of events that may be implemented in the online game are contemplated. Awards may be distributed to players at the end of a given event in the online game. For example, a virtual item, virtual currency, new abilities, new skills, and/or certain amount of points in the online game may be distributed to participating players who have achieved certain results at the end of given event. For example, the first 10 players that have reached certain ranks in the online game during an event period may be awarded with a highly demanded virtual item usable in the online game.

The event controller 126 may be configured to control implementation of events in the online game based on event information provided by users. This may involve obtaining the event information from an event information database, determining one or more events are to be started in the online game, implementing the one or more events in the online game in accordance with the event information by updating the game interfaces on the client devices and/or updating one or more online game databases, updating results of event(s) that is currently is in session in the online game, ending event(s) that has finished as indicated by the event information, and/or any other operations. The event controller 126 may be configured to execute scripts, routines, programs, and/or any other type of directives or executables provided by provider, administrator, moderator, users, and/or any other entities related to the virtual space. The scripts, routines, programs and/or any other type of directives or executables that may be executed by the event controller may be for implementing events in the online game, distributing and/or determining event awards to players within the online game, and/or for causing the game engine 124 to perform any other operations.

By way of example, the event controller 126 may obtain the event information regarding a given event to be implemented in the online game, generate instructions to one or more other components of game engine 124 (e.g., such as the messenger daemon 128 shown in FIG. 1) to implement the given event in the online game, and/or any other operations. The events implemented by the event controller 126 may include a tournament, a race, a competition, a campaign, a party, an exhibition, a match, and/or any other events facilitating player participation and/or interaction in the online game. For example, as illustration, a production competition event may be executed by the event controller 126 such that first 10 players that produce 5 knights within the next 3 hours will get a rare virtual item. As another example, a tournament event may be implemented by the event controller 126 such that the player who wins 5 car races in the online game in the next 24 hours will get an award. Other examples are contemplated.

As will be discussed below, the event information based on which the events may be implemented by event controller 126 may contain various details regarding the individual events to be implemented in the online game. By way of illustration, the event information regarding a given event may include information such as the start and end time of the given event within the online game, one or more requirements of the given event, update interval (e.g., how often the result of the event is to be updated), one or more awards to be distributed to the players participating in the given event, one or more locations of the event in the online game, one or more criteria for participating in the given event, one or more objectives of the given event, and/or any other event information. Below is one example of event information used in one embodiment for controlling implementation of an event in the online game in accordance with the present disclosure.

```
{
    "_id" : ObjectId("52b2242b7e0877805197bb6e"), // event id
    "countries" : { // countries this event is available
```

-continued

```
        "AD" : true,
        "AE" : true,
        "AF" : true ...
    },
    "date_conditions" : [ // start and end dates
    {
        "name" : "start",
        "value" : "2013-12-18 14:43:00",
        "value2" : "America/Vancouver",
        "or" : false,
        "guid" : "bf05cf99-9f16-333e-5dc7-87b1d3d7ce62"
    },
    {
        "name" : "end",
        "value" : "2013-12-21 14:43:00",
        "value2" : "America/Vancouver",
        "or" : false,
        "guid" : "ca5cf7f7-29b9-d47d-9205-d18aa8f1be9a"
    }
    ],
    "enabled" : true,
    "ended" : false,
    "interval" : 3600, // interval of when this event's
    "msgTemplates" : [ // custom message template
    {
        "name" : "customStartEventMsg",
        "params" : {
        "body" : {
        "en" : "This is the message content"
    },
        "subject" : {
        "en" : "Start Message"
    },
        "title" : {
        "en" : "Title"
    },
        "sendAt" : null
    },
        "type" : "start-all", // message type, send at start
        "sent" : true
    }
    ],
    "name" : "Click To Enter Name", // Name of event
    "rewardSystems" : [
    {
        "name" : "", // reward system type
        "rewards" : [
        {
            "boxes" : [ // boxes to hold items
            {
                "items" : [
                {
                    "data" : null,
                    "quantity" : 1,
                    "type" : "hc"
                }
                ]
            }
            ],
            "interval" : 0, // parameters the event uses
            "max" : 0,
            "min" : 0,
            "score" : 5,
            "spent" : 0
        },
        {
            "boxes" : [
            {
                "items" : [
                {
                    "data" : null,
                    "quantity" : 1,
                    "type" : "sc"
                }
                ]
            }
            ],
            "interval" : 0,
            "max" : 0,
```

-continued

```
        "min" : 0,
        "score" : 10,
        "spent" : 0
    },
    {
        "boxes" : [  // there are two boxes here
        {
            "items" : [ // this box has two items
            {
                "data" : null,
                "quantity" : 10,
                "type" : "hc"
            },
            {
                "data" : null,
                "quantity" : 5,
                "type" : "sc"
            }
            ]
        },
        {
            "items" : [
            {
                "data" : null,
                "name" : "car_name",
                "quantity" : 1,
                "type" : "inv"
            }
            ]
        }
        ],
        "interval" : 0,
        "max" : 0,
        "min" : 0,
        "score" : 100,
        "spent" : 0
    }
    ],
    "type" : "milestone_instant" // the reward system type
}
],
"sc" : { // this event is a fast tournament
    "cars" : {
        "acura_integra_typer" : true,
        "acura_rsx_types_2006" : true,
        "bmw_1m_coupe" : true...
    },
    "multipliers" : {
        "cars" : {
            "val" : 3
        },
        "performance_upgrades" : {
            "val" : 2
        },
        "races" : {
            "val" : 2
        },
        "visual_upgrades" : {
            "val" : 3
        }
    },
    "racemodes" : {
        "daily" : true,
        "ladder" : true
    },
    "racetypes" : {
        "drag" : true,
        "drift" : true
    },
    "started" : true,
    "state" : "Running", // state that the event is in
    "subtype" : "xp", // type and subtypes of this event
    "type" : "tournaments"
}
```

In some implementations, the event information regarding a given event may include information indicating a corresponding event handler for implement the given event in the online game. Such an event handler may include a block or blocks of script code that can be executed by the game engine 124 shown in FIG. 1. In some implementations, the event information regarding the given event may contain such an event handler, i.e., the block of code representing the event handler, which may be invoked by the event controller 126. In some implementations, the event information regarding the given event may include information indicating a location or locations where the event handler for the given event may be invoked by the event controller 126 for implementing the given event in the online game. By way of illustration, while the event controller 126 may be configured to execute general event functions such as start or end an event in accordance with the start and end time specified by the event information regarding the given event, or to update an event result in accordance with update interval specified in the event information, the event handler for the given event may be configured to execute event functions that are specific to the given event, and/or to manage the results of the given event.

For example, without limitation, a race event handler may be created to implement event functionality specific to the race event such as rank calculation of the race event, reporting player performance metrics after each race in the race event, determine specific awards for distribution to the participating players based on the result of the event and/or any other functionality specific to the race event; a production competition event handler may be created to execute event functionality specific to the production competition such as production accounting of the individual players during the production competition event. Other examples are contemplated.

Figure 2:
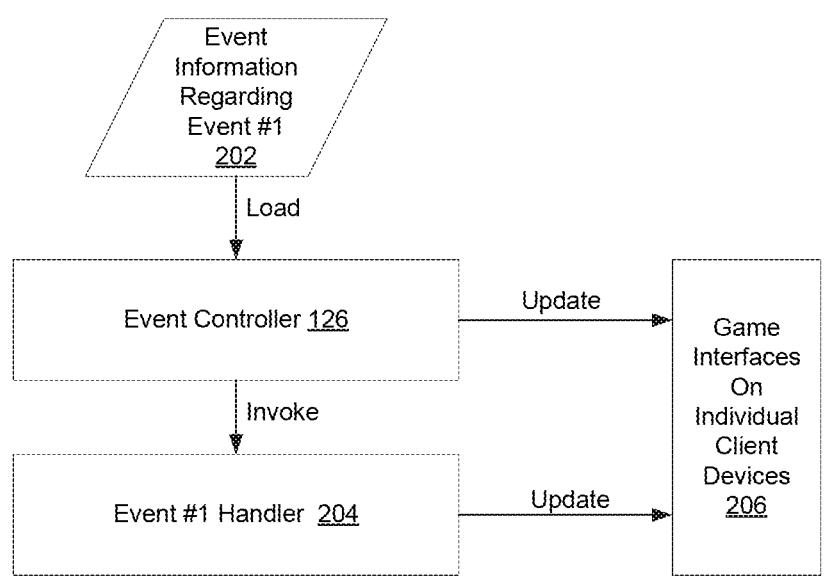
FIG. 2 is an exemplary block diagram illustrating event controller shown in FIG. 1 may be configured to invoke an event handler for a corresponding event to be implemented in the online game.

FIG. 2 is an exemplary block diagram illustrating event controller 126 may be configured to invoke an event handler for a corresponding event to be implemented in the online game. As shown, the event controller 126 may load event information 202 regarding a given event for implementation of the given event in the online game. An example of the event information 202 used in one embodiment in accordance with the present disclosure is described above. As explained above, the event information 202 may include information indicating an event handler 204 for implementing the given event in the online game. As explained above, the event controller 126 may be configured to execute one or more general event functions for implementing the given event such as announcing the given event in the online game in accordance with the event period information specified in the event information 202; and the event handler 204 may be invoked by the event controller 126 t0 execute functions specific to the given event such as calculating player ranks in the event, determining event result(s), and/or any other event function(s) specific to the given event. As shown, the event controller 126 and the event handler 204 for the given event may be configured to effectuate updates to game interfaces 206 on the individual client devices 104. For example, the event controller 126 may cause a notification of general event information to players on the client devices 104, and the event handler 204 may cause an update of event result(s) to be presented to the players on the client devices 104. It should be understood the division as to the functions to be executed by the event controller 126 and the event handler 204 may be however desired by the provider, administrator, moderator, and/or any other entities related to the online game. It is contemplated in some implementations, the event handler 206 may be delegated to execute some functions general to event implementation in the online game, and in some implementations, the event controller 126 may be configured to execute some functions specific to implementation of the given event in the online game.

By way of example, without limitation, the event controller 126 may be configured to retrieve event information 202 regarding a race event to be started at a specific point of time, e.g., T, in the online game, and to be ended at time T+t in the online game. The event information may specify the result of the race event is to be updated every hour during the event period. The event information 202 may specify a location of a race event handler 204 may be used by the event controller 126 to start the race event, and/or to update the results of the race event for presentation in the game interface 206 provided on client device 104. At time T, the event controller 126 may start the race event by invoking the race event handler, which may instigate a specific race event setup routine in the online game. Once the race event is started at time T, the event controller 126 may update the result of the race event once every hour by invoking the specific race update event routine provided by the race event handler.

Returning to FIG. 1, the messenger daemon 128 may be configured to transmit to client devices 104 messages regarding the events implemented by the event controller 126. The messages transmitted by the messenger daemon 128 may include in-game notifications, external electronic messages (emails), voice call/mails, video notifications, audio notification, taptic notifications and/or any other types of messages. This may involve obtaining addressable identifications associated with the client devices 104 such as machine names, IP addresses, email addresses, device addresses (e.g., MAC), and/or any other type of addressable identification associated with the client devices. In some implementations, one or more message templates may be predetermined by the provider, administrator, moderator, and/or any other entities related to the online game and may be obtained by the messenger daemon 128, and may be used by the messenger daemon 128 to prepare messages for transmission to the users. For example, a template event announcement message may be preset by an administrator of the online game that includes generic information indicating an event is to be started in the online game. The messenger daemon 128 may obtain such an event announcement message template and prepare messages to be transmitted to client devices 104 announcing a given event is about to start by filling in the announcement message template with event information specific to that given event as obtained by the event controller 126.

In some implementations, the messenger daemon 128 may receive instructions from the event controller 126 to transmit messages regarding a specific event implemented by the event controller 126. For example, the messenger daemon 128 may receive an event announcement request from the event controller 126, and the received request may include the announcement message the event controller 126 requests the messenger daemon 128 to transmit to the client devices 104. In that example, the messenger daemon 128 may extract the event announcement message from the event announcement request and transmit it to the client devices 104. In some implementations, the event controller 126 may be configured to request the messenger daemon 128 once in every certain period, for example—every hour, to transmit event update messages to the client devices 104. The event update messages may include information indicating the progress of the event in the online game, current player rankings in the event, one or more highlights that have taken place in the event, and/or any other event update information.

The delivery daemon 130 may be configured to determine and/or distribute awards for the players participating in the events implemented by the event controller 126. This may involve instantiating awards of corresponding award types, distributing the instances of the awards to the inventory of players, recording the awards that have been distributed to the players, and/or any other operations. In some examples, this may involve dynamically obtaining for a given player for a given rank at the end of the event period; and distributing an award to the given player's inventory based on the given rank. For example, in a case where a given player achieves a fourth place rank at the end of the event period, an award may be distributed to the player's inventory based on the rank achieved by the given player; and, by comparison, if the given player achieves a second place rank at the end of that event period, a different award may be distributed to the given player by the delivery daemon 130 for awarding the given player achieving the second place rank in the event; and so on. In some examples, the award distributed to the player inventories by the delivery daemon 130 may be in accordance with one or more award tables, conversion tables, and/or any other award schemes predetermined by the provider, administrator, moderator, and/or any other entities related to the online game. For example, an award table may be predetermined by the provider of the online game to specify different Awards for the first place rank, second place rank, third place rank, and so on.

In some implementations, the delivery daemon 130 may determine and/or distribute awards to individual players based on award information regarding individual types of awards, which may be obtained from an event information database, a game database, and/or any kind of electronic storage related to the online game. The award information regarding a given type of award may specify information including name, quantity, time and/or frequency of distribution, graphical representation, and/or any other award information for distributing instances of awards of the given award type to players within the online game. By way of illustration, award information regarding a rare virtual item may specify the name of the award (e.g., medal of honor), the quantity of the virtual item distributed as the award (e.g., one), graphical representation of the award (e.g., a piece of art representing a medal), and/or any other information. The delivery daemon 130 may obtain such award information and instantiate instances of the awards in accordance with the award information.

In some implementations, the award information regarding a given type of award may include information indicating a corresponding award handler. Such an award handler may include a block or blocks of script code that may be executed by the game engine 124. For example, the award handler may be used by the delivery daemon 130 to control award determination and/or distribution of the instances of the award of the given type. For example, an award handler of mystery box award type may be configured to open the mystery box and perform the stochastic distribution of the mystery box after it is awarded to the user. As another example, an award handler of a Gacha spin tokens may be configured to deposit the awarded Gacha spin tokens into a Gacha box for a player in the online game after the Gacha spin tokens are awarded to the player. Still as another example, an award handler of a resource hold limit may be configured to increase the limit the player may hold his/her resources after an award to increase resource hold limit is awarded to the player. Yet as another example, an award handler of a player level increase award may be configured to increase the player level in the online game after an award of level increase is awarded to the player in the online game. Other examples are contemplated.

Below is an exemplary award handler (Redeemer) configured to handle award (elite car) distribution to players within the online game.

```
var Redeemer = require('lib/redeemer/redeemer');
var JobManager = require('framework/jobmanager');
var PushCall = require('helpers/pushcall');
function EliteCarRedeemer( typeName, displayName, options ) {
Redeemer.call( this, typeName, displayName, options );
var self = this;
self.carsCollection =
require('models/collection').create(options.db, 'cars');
self.pushCall = new PushCall(options.config);
self.gacha_controller = null;
}
require('util').inherits(EliteCarRedeemer,Redeemer);
EliteCarRedeemer.prototype.parseData = function( data, cb ) {
var self = this;
var car = "";
var prestige = "";
var prestigeclass = -1;
var tid = "";
var filterTag = "";
if( data.length > 0 ) {
    var firstBreakdown = data.split( '@' );
    if( firstBreakdown.length == 2 ){
        var secondBreakdown = firstBreakdown[0].split( ':' );
        car = secondBreakdown[ 0 ]
        if( secondBreakdown.length == 2 ) {
          prestige = secondBreakdown[ 1 ];
          prestigeclass = parseInt( prestige.split('_').pop( ) )
          if( isNaN( prestigeclass ) == false ) {
            prestigeclass -= 1;
          }
          else {
            prestige = "";
            prestigeclass = -1;
          }
        }
        tid = firstBreakdown[ 1 ];
        filterTag = 'elite_' + car + '_' + tid;
    }
}
return cb( car, prestige, prestigeclass, tid, filterTag );
}
EliteCarRedeemer.prototype.redeem = function( uid, item, reason,
options, cb ){
var self = this;
if( self.gacha_controller == null ){
self.gacha_controller =
require('lib/gacha/gacha_controller').create( self.options );
}
self.parseData( item.type, function( carName, prestige,
prestigeclass, tid, filterTag ){
    if( ( carName.length > 0 ) && ( tid.length > 0 ) )
    {
var giftcar = null;
        for (var i in self.config.cars.recipes) {
            var car = self.config.cars.recipes[i];
            if( car.n == carName ) {
                giftcar = car;
                break;
            }
        }
        if( giftcar != null ) {
            giftcar.tid = tid;
//Magic numbers for hard coding the elite visual upgrades
            giftcar.vu[0] = 2129742007;
            giftcar.vu[3] = 1903376227;
            if( ( prestige != null ) && ( prestige.length > 0
) && ( prestigeclass >= 0 ) ) {
                giftcar.pc = prestige;
                giftcar.c = prestigeclass;
            }
```

```
            var cars = [ ];
            for( var j = 0; j < quantity; ++j ) {
                cars.push( { q: giftcar.q, r: giftcar, uid:
uid, s: Math.ceil(Math.random( ) * 1000) }
            var jm = new JobManager( );
            jm.forEach( cars, function( c,next ){
                self.carsCollection.insert( c, function(
err, result ){
                    setImmediate( function( ) {
                        next( err );
                    });
                });
            }, function(err){
                self.pushCall.publish( uid.toString( ), {
component:'CarManager', message:'refresh'
                self.gacha_controller.addFilterTag( uid,
filterTag, 1, function( err, result ){
                    if( err != null ){
                        console.error( "Problem applying
the filter tag", filterTag, "to uid:"
                        return cb( err, { } );
                    }
                    var prize = { };
                    prize.type = 'elite';
                    prize.data = carName;
                    prize.quantity = item.quantity;
                    return cb( null, prize );
                });
            });
        }
        else{
            var err = 'Invalid car ' + carName + ' for user ' +
uid;
            return cb( err, null );
        }
    }
    else {
        return cb( "CarName and tournament must be specified for
elite redeemer in the format <carName>@<"
        });
};
EliteCarRedeemer.prototype.filter = function( data, cb ){
    var self = this;
    self.parseData( data, function( carName, prestige,
prestigeclass, tid, filterTag ){
        var query = { };
        query[ 'filtertags.' + filterTag ] = { $exists: true
};
        var filter = { };
        filter.collection = 'gacha_users';
        filter.query = query;
        return cb( null, filter );
    });
}
module.exports.init = function( typeName, options ){
    var displayName = "Elite Car";
    console.log( typeName, "- Initializing", displayName,
"Redeemer" );
    return new EliteCarRedeemer( typeName, displayName, options
);
};
```

Figure 3:
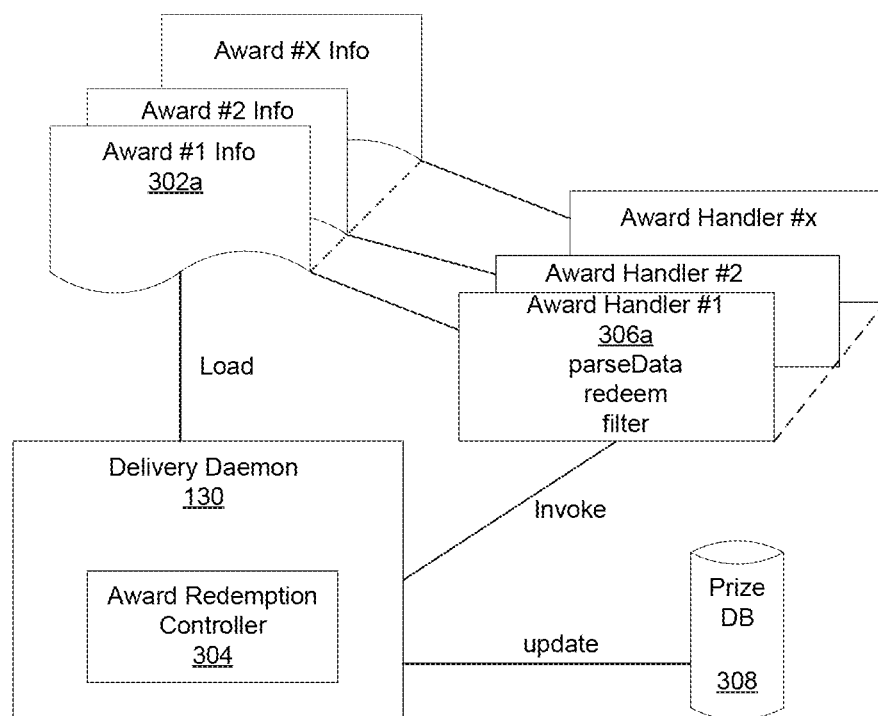
FIG. 3 is an exemplary block diagram illustrating delivery daemon may be configured to invoke award handler for a corresponding award.

FIG. 3 is an exemplary block diagram illustrating delivery daemon may be configured to invoke award handler for a corresponding award. As shown, in some examples, as in this example, the delivery daemon 130 may include an award redemption controller 304. The award redemption controller 304 may be configured to control invocation of individual award handlers for determining and/or distributing awards to players in the online game. The award redemption controller 304 may be configured to execute scripts, routines, programs, and/or any other type of directives or executables provided by provider, administrator, moderator, users, and/or any other entities related to the online game. The scripts, routines, programs and/or any other type of directives or executables that may be executed by the award redemption controller 304 may be for automatically determining, distributing instances of awards in the online game, and/or for causing the award redemption controller 304 to perform any other operations.

As shown FIG. 1, the delivery daemon 130 may be configured to load the award information 302 regarding individual awards. As described above, the award information 302 for a given award may include information indicating the corresponding award handler to be invoked by the delivery daemon 130, for example via the award redemption controller 304 as shown. As also shown, the delivery daemon 130 may be configured to update a prize database 308 in this example. The prize database 308 may be configured to store information regarding award distribution to the players, such as when an award is distributed to which player, a quantity of the award distributed to that player, and/or any other information.

The delivery daemon 130 may be invoked by the event controller 126 when implementing a given event to distribute one or more event awards to inventories of the players based on their rankings at the end of the event. For example, the event controller 126 may invoke the delivery daemon 130 at the end of an event executed by the event controller 16 to have the delivery daemon 130 distribute one or more event awards to top ranked players in the event. In response to such a request from the event controller 126, the delivery daemon 130 may distribute the event awards.

Figure 4:
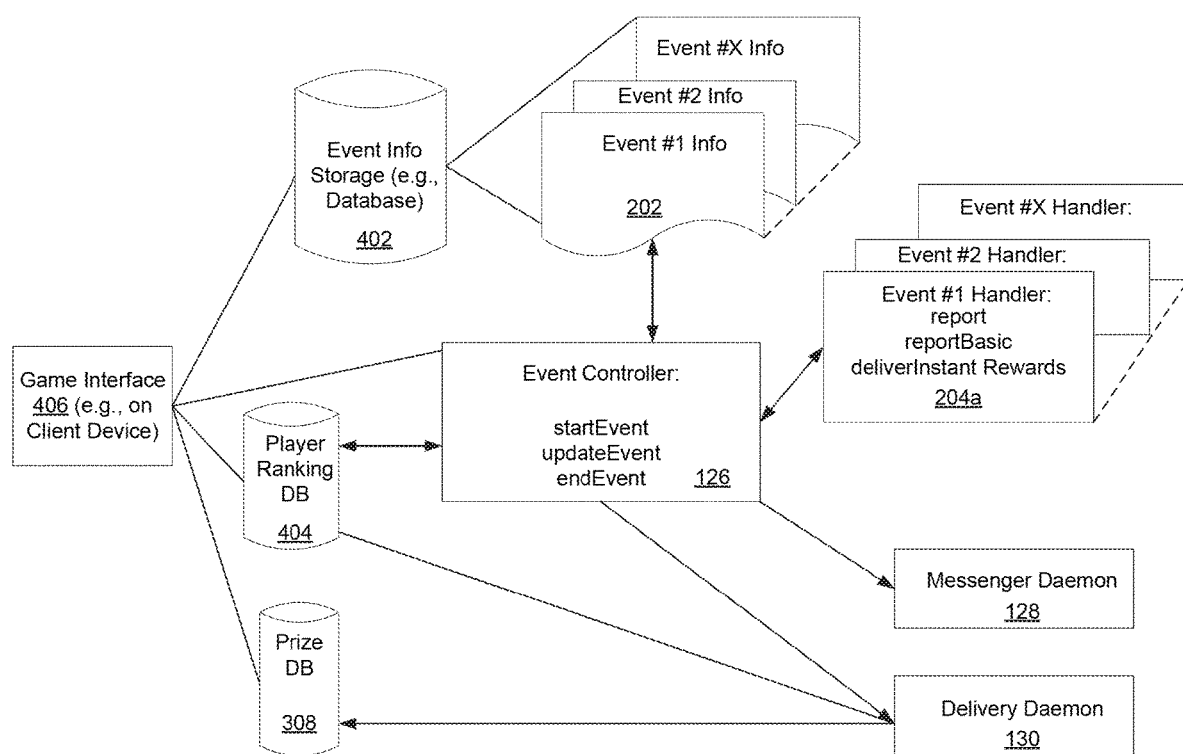
FIG. 4 is an exemplary block diagram illustrating event controller shown in FIG. 1 may be configured to invoke the event handlers shown in FIG. 2 and the delivery daemon shown in FIG. 3.

FIG. 4 is an exemplary block diagram illustrating event controller 126 may be configured to invoke the event handlers 212 and delivery daemon 130. It will be described with reference to FIGS. 1-3. As shown in this example, a game interface 406 may be implemented and provided to a given client device 104. As shown, the game interface may be implemented with updates from the event information database 402, the player ranking database 404, the prize database 30, and/or any other components. As described above, the game interface 406 may be implemented by the game engine 124 shown in FIG. 1. As also shown, the event information database 402 may be configured to store event information records, such as the event information 202 shown in FIG. 2. The event information 202 may be obtained by the event controller 126, which may implement events in the online game in accordance with the event information 202. As described above, the event information 202 may include information indicating corresponding event handlers 204 may be invoked by the event controller 126. As also shown, the event controller 126 may be configured to instruct the messenger daemon 128 to transmit messages to client devices 104 and invoking delivery daemon 130 to determine and/or distribute awards to players within the online game.

Returning to FIG. 1, the server 102 may communicate with the server 120. The communication between the servers 102 and 120 may include communications of event information and/or award information. The server 102 may comprise a processor 108 configured to execute machine-readable instructions. As shown, the processor 108 may comprise an event interface component, an event management component, an award interface component 112, an event management component 114, an award interface component 116, an award management component 118, and/or any other components.

Figure 5:
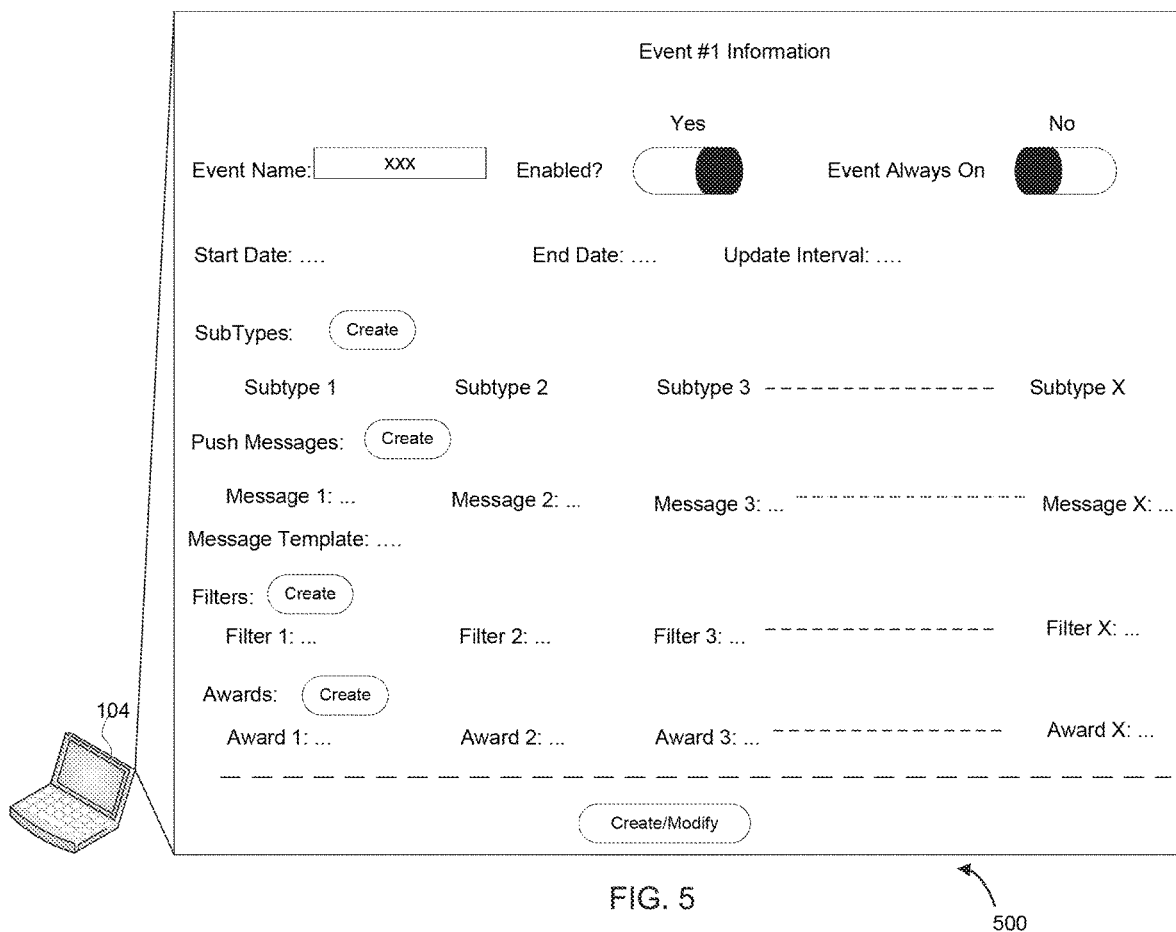
FIG. 5 illustrates one example an interface that may be provided on a client device for providing the event information.

The event interface component may be configured to provide an interface on a client device 104 enabling a player associated with the client device 104 to provide event information 202, which may be used by the event controller 126 to implement events in the online game. FIG. 5 illustrates one example an interface that may be provided on a client device 104 for providing the event information. It will be described with reference to FIG. 1. As shown in this example, an interface 500 may be implemented on a client device 104. The interface 500 may enable a user, for example an administrator, a moderator, a programmer, a developer and/or any other entities related to the online game to provide event information, such as the event information 202 shown in FIG. 2, so that corresponding events may be implemented in the online game. In this example, the interface 500 is shown to enable the user to provide various information regarding a given event (e.g., event #1 as shown) for implementation in the online game. As shown, an input box may be provided in the interface to enable the user to input a name for the event; a selection switch to enable the user to indicate whether the event should be enabled in the online game (a selection of yes, as shown, in this example, indicates the event should be implemented—e.g., by the event controller 126—in the online game and a selection of no indicates the event should not implemented); and a selection switch to enable the user to indicate whether the event should always enabled in the online game (a selection of yes indicates the event controller 126 should always implement the given event in the online game, and a selection of no indicates the event controller 126 should not always implement the given event); input fields enabling the user to input a date and/or time when the event should be implemented in the online game, a date and/or time when the event should be terminated in the online game, a frequency at which the event should be implemented within the online game. As also shown, the interface 500 may include input fields to enable the user to generate one or more sub-type of events to be implemented during the given event. For example, a first sub-event may be implemented during the given event. The sub-type event creation may be facilitated by an interface similar to interface 500. As shown, multiple sub-events may be during the given event. As still shown, input fields may be provided in the interface 500 to enable the user to create one or more messages to be communicated to the players in connection with the given event. For example, an announcement message may be created by the user such that an announcement of the commencement of the event will be made to the players within the online game when the given event is implemented in the online game. As described above, the message(s) created by the interface 500 may be transmitted by messenger daemon 130 to the client devices 104. As still shown, the interface 500 may enable the user to create one or more filters for the given event. The filers may serve as event criteria for implementing the event. For example, as described above, a filter may be created for the given event such that only players with certain rank in the online game may participate in the given event. As another example, a filter may be created for the given event such only players from certain geographic region may participate in the event. Still as another example, a filter may be created for the given event such that players from certain alliances may participate in the given event. As still shown, the interface 500 may enable the user to create one or more awards for distribution to the participating players in connection with the given event. It should be understood the various event information shown in FIG. 5 as being provided by the user is merely illustrative and is not intended to be limiting. In some other examples, more or less event information may be provided by the user through the interface 500.

Returning to FIG. 1, the event information management component 114 may be configured to manage event information provided by the users of the online game. Managing event information by the event information management component may include storing, retrieving, updating, deleting, backing up the event information provided by the users, and/or any other operations. For example, the event information management component 114 may be configured to retrieve event information in response to a request from the event controller 126 as described above.

Figure 6:
FIG. 6 illustrates an exemplary interface that may be provided on a client device to enable a user to provide award information for an event
Figure 6:
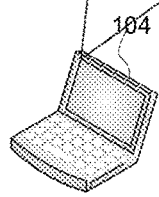

The award interface component 116 may be configured to provide award interfaces on client devices 104 to enable users to provide information regarding awards to be distributed within the online game. FIG. 6 illustrates an exemplary interface that may be provided on a client device 104 to enable a user to provide event award information for an event. It will be described with reference to FIG. 5. As shown, an award interface 600 may be provided on the client device 104 to enable a user to create an award for an event implemented in the online game. For example, the award interface 600 may be provided on the client device 104 after the user selects to create an award for distribution in the event interface 500. As shown, the award interface 600 may enable the user to provide a name of the award to be distributed to the participating players of the event, a description of the award, an objectID indicating a corresponding award type (e.g., virtual item, points, level, skill and/or any other type of award type), a quantity of the award, one or more requirements for distributing the award. As shown, the award requirements may include a player ranking requirement indicating the award is distributed only to players that have breached a certain event rank at the end of the event period of the event, a user level requirement indicating the award is distributed only to players that have breached a certain user level in the online game at the end of the event period of the event, and/or any other award requirements. It should be understood the various award information shown in FIG. 6 as being provided by the user is merely illustrative and is not intended to be limiting. In some other examples, more or less award information may be provided by the user through the interface 600.

Returning to FIG. 1, the award information management component 118 may be configured to manage award information provided by the users of the online game. Managing award information by the award information management component 118 may include storing, retrieving, updating, deleting, backing up the award information provided by the users, and/or any other operations. For example, the award information management component 118 may be configured to retrieve award information in response to a request from the even controller 126 and/or the delivery daemon 130 as described above.

The servers 102 and 122, client computing platforms 104, and/or external resources 106 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which servers 102, client computing platforms 104, and/or external resources 106 may be operatively linked via some other communication media.

A given client computing platform 104 may include one or more processors configured to execute computer program components. The computer program components may be configured to enable an expert or user associated with the given client computing platform 104 to interface with system 100 and/or external resources 106, and/or provide other functionality attributed herein to client computing platforms 104. By way of non-limiting example, the given client computing platform 104 may include one or more of a desktop computer, a laptop computer, a handheld computer, a tablet computing platform, a NetBook, a Smartphone, a gaming console, and/or other computing platforms.

The external resources 106 may include sources of information, hosts and/or providers of virtual environments outside of system 100, external entities participating with system 100, and/or other resources. In some implementations, some or all of the functionality attributed herein to external resources 106 may be provided by resources included in system 100.

The server 102 may include electronic storage 110, one or more processors 108, and/or other components. The server 102 may include communication lines or ports to enable the exchange of information with a network and/or other computing platforms. Illustration of server 102 in FIG. 1 is not intended to be limiting. The server 102 may include a plurality of hardware, software, and/or firmware components operating together to provide the functionality attributed herein to server 102. For example, server 102 may be implemented by a cloud of computing platforms operating together as server 102.

Electronic storage 110 may comprise electronic storage media that electronically stores information. The electronic storage media of electronic storage 110 may include one or both of system storage that is provided integrally (i.e., substantially non-removable) with server 102 and/or removable storage that is removably connectable to server 102 via, for example, a port (e.g., a USB port, a FireWire port, etc.) or a drive (e.g., a disk drive, etc.). Electronic storage 110 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 110 may include one or more virtual storage resources (e.g., cloud storage, a virtual private network, and/or other virtual storage resources). Electronic storage 110 may store software algorithms, information determined by processor 108, information received from server 102, information received from client computing platforms 104, and/or other information that enables server 102 to function as described herein.

Processor(s) 108 and processor(s) 122 are configured to provide information processing capabilities in server 102 and server 120, respectively. As such, processor 108 and/or processor 122 may include one or more of a digital processor, an analog processor, a digital circuit designed to process information, an analog circuit designed to process information, a state machine, and/or other mechanisms for electronically processing information. Although processor 108 and processor 122 is shown in FIG. 1 as a single entity, this is for illustrative purposes only. In some implementations, processor 108 may include a plurality of processing units. These processing units may be physically located within the same device, or processor 108 and processor 122 may represent processing functionality of a plurality of devices operating in coordination. The processor 108 may be configured to execute components 112, 114, 116 and 118. Processor 108 may be configured to execute components 112, 114, 116 and 118 by software; hardware; firmware; some combination of software, hardware, and/or firmware; and/or other mechanisms for configuring processing capabilities of processor 108. The processor 122 may be configured to execute components 124 126, 128 and 130. Processor 122 may be configured to execute components 124 126, 128 and 130 by software; hardware; firmware; some combination of software, hardware, and/or firmware; and/or other mechanisms for configuring processing capabilities of processor 108.

It should be appreciated that although components 112, 114, 116, 118, 124 126, 128 and 130 are illustrated in FIG. 1 as being co-located within a single processing unit, in implementations in which processor 108 includes multiple processing units, one or more of components 112, 114, 116, 118, 124 126, 128 and 130 may be located remotely from the other components. The description of the functionality provided by the different components 112, 114, 116, 118, 124 126, 128 and 130 described below is for illustrative purposes, and is not intended to be limiting, as any of components 112, 114, 116, 118, 124 126, 128 and 130 may provide more or less functionality than is described. For example, one or more of components 112, 114, 116, 118, 124 126, 128 and 130 may be eliminated, and some or all of its functionality may be provided by other ones of components 112, 114, 116, 118, 124 126, 128 and 130. As another example, processor 108 may be configured to execute one or more additional components that may perform some or all of the functionality attributed below to one of components 112, 114, 116, 118, 124 126, 128 and 130.

Figure 7:
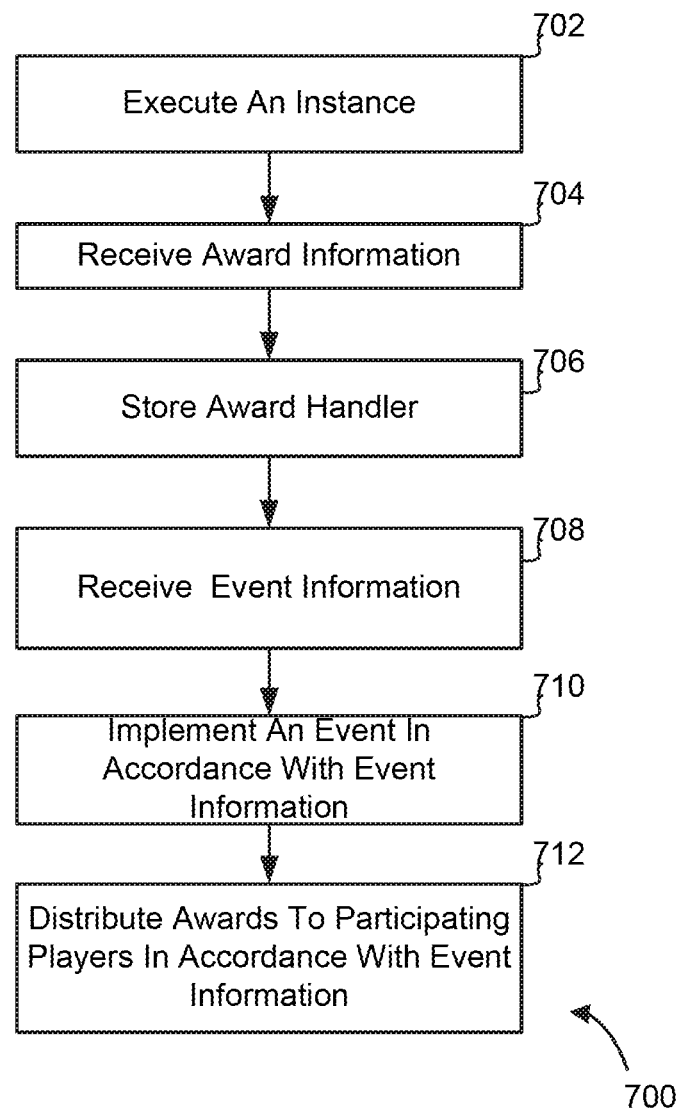
FIG. 7 illustrates one exemplary method 700 for facilitating implementation of events within an online game in accordance with the disclosure in accordance with the disclosure.

FIG. 7 illustrates one exemplary method 700 for facilitating implementation of events within an online game in accordance with the disclosure in accordance with the disclosure. The operations of method 700 presented below are intended to be illustrative. In some embodiments, method 700 may be accomplished with one or more additional operations not described, and/or without one or more of the operations discussed. Additionally, the order in which the operations of method 700 are illustrated in FIG. 7 and described below is not intended to be limiting.

In some embodiments, method 700 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 700 in response to instructions stored electronically on an electronic storage medium. The one or more processing devices may include one or more devices configured through hardware, firmware, and/or software to be specifically designed for execution of one or more of the operations of method 700.

At an operation 702, an instance of an online game may be executed. In some implementations, operation 702 may be performed by a game engine the same as or similar to game engine 124 (shown in FIG. 1 and described herein).

At an operation 704, award information may be received from the users of the online game hosted in operation 702. The award information received at operation 704 may define types of in-game awards to be distributed to players within the online game. For example, award information for awarding a virtual item to players within the online game may be provided by a user of the online game, which may include administrator, moderator, programming, developer, and/or any other entities related to the online game. In some implementations, operation 704 may be performed by an award information management component the same as or similar to award information management component 118 (shown in FIG. 1 and described herein).

At an operation 706, award handlers corresponding to the award information received at operation 704 may be stored. In some implementations, the award information regarding a given type of award as received at operation 704 may include information indicating a corresponding award handler. The corresponding award handler may be used by a game engine to control award determination and/or delivery for instances of the award of the given type in the instance of the online game executed in at operation 706. For example, an award handler of mystery box award type may be configured to open the mystery box and perform the stochastic distribution of the mystery box after it is awarded to the user. Operation 706 may be performed by an award information management component the same as or similar to award information management component 118 (shown in FIG. 1 and described herein).

At an operation 708, event information may be received from players for implementing events in the online game. The event information received from the players at operation 708 may include event award information indicating instance(s) of an award of a given award type defined by the award information received at operation 706. In some implementations, operation 708 may be performed by an event information management component the same as or similar to event information management component 114 (shown in FIG. 1 and described herein).

At an operation 710, an event may be implemented in accordance with the event information received at operation 708. In some implementations, operation 708 may be performed by event controller the same as or similar to event controller 126 (shown in FIG. 1 and described herein).

At an operation 712, one or more awards may be distributed to participating players of the event implemented at operation 710 in accordance with the event information received at operation 708. In some implementations, operation 712 may be performed by a delivery daemon the same as or similar to delivery daemon 130 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. An online game system configured to host an online game, the system comprising one or more physical processors configured by machine-readable instructions to:

transmit information to individual client devices for presentation of the online game on the individual client devices;

manage award information that defines types of in-game awards to be distributed to players within the online game, wherein the award information includes first award information that defines a first award type and second award information that defines a second award type;

store, in electronic storage, award handlers as blocks of executable code, wherein individual ones of the award handlers correspond to the individual types of in-game awards defined by the award information, the individual ones of the award handlers being configured to distribute instances of in-game awards of corresponding types to the players, wherein the award handlers include a first award handler and a second award handler, wherein the first award handler is configured to distribute instances of in-game awards of the first award type, wherein the second award handler is different from the first award handler, and wherein the second award handler is configured to distribute instances of in-game awards of the second award type;

manage event information for implementing events in the online game such that first event information includes a first event handler, wherein the first event handler includes machine-readable instructions to implement the first event in the online game, wherein the first event information indicates the first award handler; and implement the first event handler, wherein implementing the first event handler in the online game includes:
  invoking the first award handler to distribute the one or more instances of in-game awards of the first award type as first event awards in accordance with a result of the first event.

2. The online game system of claim 1, wherein the first event information includes one or more award requirements such that the first event awards are distributed to player inventories of the players in accordance with the award requirements.

3. The online game system of claim 2, wherein the award requirements include a player ranking requirement indicating the first event awards are distributed only to players that have breached a certain event rank at the end of the event period of the first event, and/or a user level requirement indicating the first event awards are distributed only players that have breached a certain user level in the online game at the end of the event period of the first event.

4. The online game system of claim 1, wherein the first event information further includes first event period information indicating a start time and/or an end time of the first event within the online game.

5. The online game system of claim 4, wherein implementing the first event in the online game includes starting the first event within the online game at the start time and/or stopping the first event within the online game at the end time.

6. The online game system of claim 1, wherein implementing the first event in the online game includes transmitting to players one or more messages announcing the first event starts at a start time and/or ends at an end time.

7. The online game system of claim 1, wherein implementing the first event in the online game includes determining first event rankings for the participating players of the first event at the end of the event period of the first event.

8. The online game system of claim 1, wherein the first event information includes information indicating the first event is available for participation only by players that meet a first player requirement, and wherein implementing the first event in the online game includes facilitating player participation in the first event in accordance with the first player requirement.

9. The online game system of claim 8, wherein the first player requirement includes a region requirement, a user skill requirement, a user age requirement, or a virtual currency requirement.

10. A method for hosting an online game, the method being implemented in a physical processor configured to execute machine-readable instructions, the method comprising:
  transmitting information to individual client devices for presentation of the online game on the individual client devices;
  managing award information that defines multiple types of in-game awards to be distributed to players within the online game, wherein the award information includes first award information that defines a first award type and second award information that defines a second award type;
  storing, in electronic storage, award handlers as blocks of executable code, wherein individual ones of the award handlers correspond to the individual types of in-game awards defined by the award information, the individual ones of the award handlers being configured to distribute instances of in-game awards of corresponding types to the players, wherein the award handlers include a first award handler and a second award handler, wherein the first award handler is configured to distribute instances of in-game awards of the first award type, wherein the second award handler is different from the first award handler, and wherein the second award handler is configured to distribute instances of in-game awards of the second award type;
  managing event information for implementing events in the online game such that first event information includes a first event handler, wherein the first event handler includes machine-readable instructions to implement the first event in the online game, wherein the first event information indicates the first award handler; and
  implementing the first event handler, wherein implementing the first event handler in the online game includes:
    invoking the first award handler to distribute the one or more instances of in-game awards of the first award type as first event awards in accordance with a result of the first event.

11. The method of claim 10, wherein the first event information includes one or more award requirements such that the first event awards are distributed to player inventories of the players in accordance with the award requirements.

12. The method of claim 11, wherein the award requirements include a player ranking requirement indicating the first event awards are distributed only to players that have breached a certain event rank at the end of the event period of the first event, and/or a user level requirement indicating the first event awards are distributed only players that have breached a certain user level in the online game at the end of the event period of the first event.

13. The method of claim 10, wherein the first event information further includes first event period information indicating a start time and/or an end time of the first event within the online game.

14. The method of claim 13, wherein implementing the first event in the online game includes starting the first event within the online game at the start time and/or stopping the first event within the online game at the end time.

15. The method of claim 10, wherein implementing the first event in the online game includes transmitting to players one or more messages announcing the first event starts at a start time and/or ends at an end time.

16. The method of claim 10, wherein implementing the first event in the online game includes determining first event rankings for the participating players of the first event at the end of the event period of the first event.

17. The method of claim 10, wherein the first event information includes information indicating the first event is available for participation only by players that meet a first player requirement, and wherein implementing the first event in the online game includes facilitating player participation in the first event in accordance with the first player requirement.

18. The method of claim 17, wherein the first player requirement includes a region requirement, a user skill requirement, a user age requirement, or a virtual currency requirement.

* * * * *